UNITED STATES PATENT OFFICE.

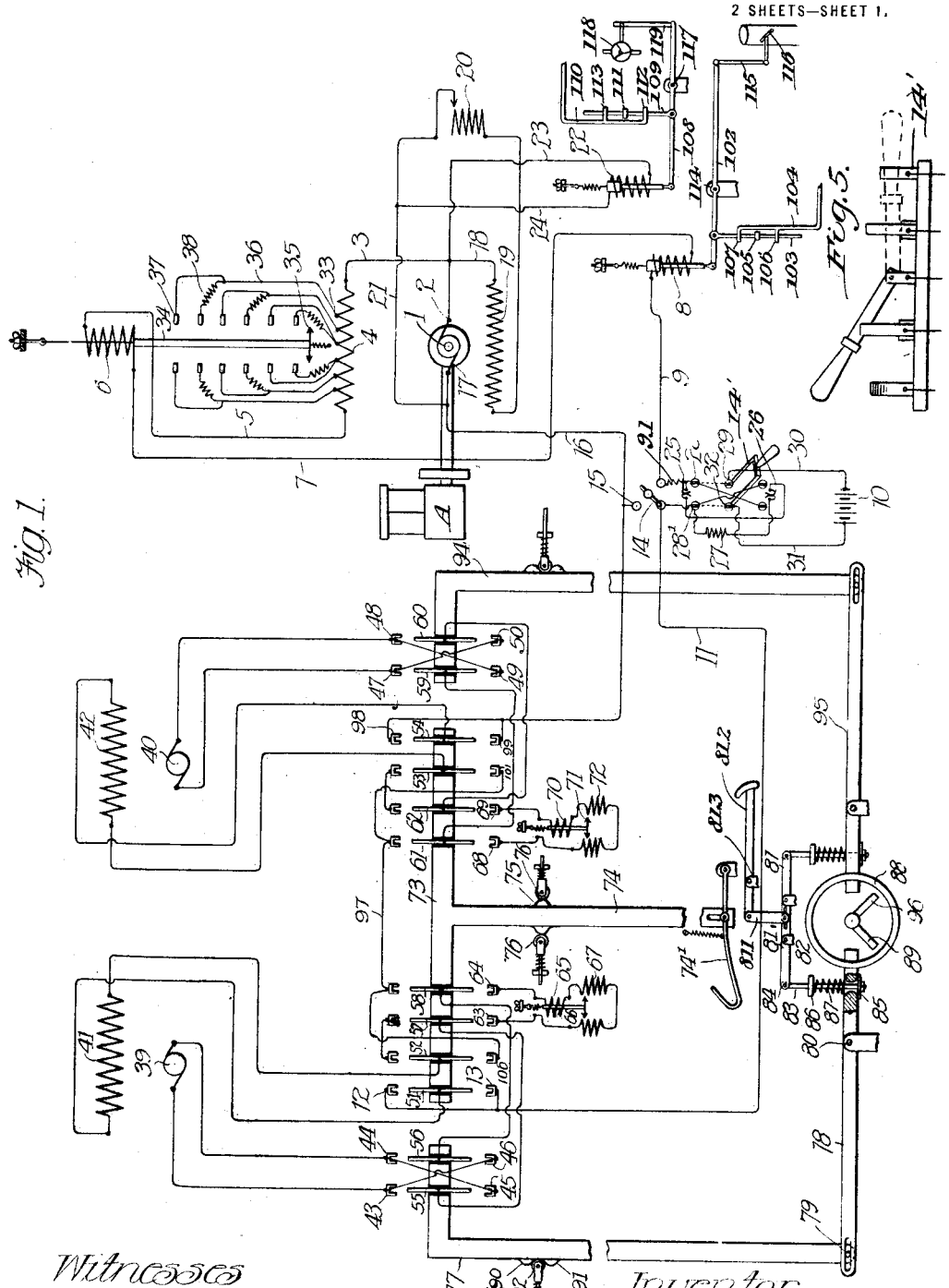

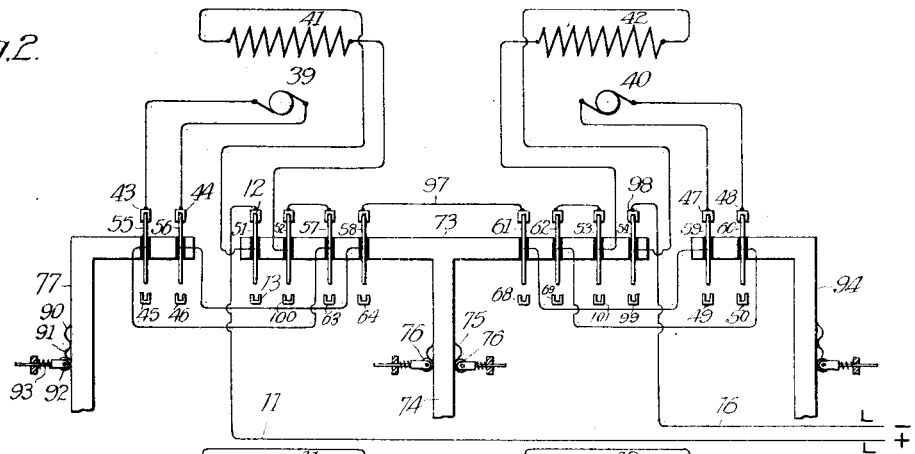

JOHN W. PEARSON, OF CHICAGO, ILLINOIS.

MOTOR-VEHICLE.

1,175,377.   Specification of Letters Patent.   Patented Mar. 14, 1916.

Application filed June 22, 1911. Serial No. 634,754.

*To all whom it may concern:*

Be it known that I, JOHN W. PEARSON, a citizen of the United States of America, and a resident of Chicago, county of Cook, State of Illinois, have invented certain new and useful Improvements in Motor-Vehicles, of which the following is a specification.

The main objects of this invention are to provide improved and simple means of linking the engine of an automobile with the driving wheels by the use of an electric generator mechanically connected to the engine, and driving motors electrically connected to the generator to provide improved automatic governing means; and to provide suitable improved and simple switching devices which will start, stop, brake, and reverse the driving motors.

A specific construction embodying this invention is illustrated in the accompanying drawings, in which—

Figure 1 is a diagrammatic sketch of the electrical circuits and controls connecting the electric generator and two motors, the switches being in the neutral or off position. Fig. 2 is a diagrammatic sketch of the two motors and the switching connections when the motors are connected for forward operation. Fig. 3 is a diagrammatic sketch of the two motors and switching device in the braking position. Fig. 4 is a diagrammatic sketch of the switches and electric circuits connecting two motors, one operating forward and the other reverse. Fig. 5 is a side elevation of the battery reversing switch and spring contacts associated therewith.

In the construction shown the armature 1 of a series generator, having an auxiliary booster field, is connected to a prime mover A, which may be an internal combustion engine, and the series field coil is normally excited by means of a circuit which is completed from the brush 2 through the lead 3 to the series field coil 4. From the series field coil 4 the lead 5 is connected to the solenoid coil 6. The lead 7 is connected to a second solenoid coil 8. From the coil 8, by way of the lead 9, the circuit leads to a storage battery 10. In case the battery charging switch 14 is swung to make a contact with the terminal 15, then the generator circuit is completed by way of the storage battery 10 through the lead 16, back to the opposite brush 17, producing a complete closed circuit for the series coil of the generator through the storage battery 10. The booster field circuit starts from the brush 2 by way of the lead 18, through the shunt field coil 19, to a manually controlled rheostat 20, adapted for adjusting the voltage and for opening the booster circuit when desired, which rheostat is in turn connected by way of the lead 21 to the brush 17. Thus are completed both the series field coil circuit and the booster field coil circuit of the generator independent of the driving motors. The battery 10 is provided mainly to facilitate starting the engine A by motor action of the generator, as will be understood, and is not intended to be used to supply current to the motors proper. It is preferably charged only when the motors are disconnected from the circuit. The motors are supplied with current from the generator by the circuit including leads 7, 9, 11 and 16.

Connected across the generator brushes is an automatic solenoid 22 which is connected by way of the leads 23 and 24 respectively. The storage battery 10 is in the charging position when the switch 14 is in contact with the terminal 15. Provision is made by which the storage battery can be used to either start the armature 1, or the storage battery can be charged by operating a double-pole, double-throw knife switch 14', the handle of which is arranged to break spring contacts 25 when in the charging position, and the spring contacts 26 when in the discharging position. When the generator is run by the engine without load the voltage is below that of the battery, even with the booster winding 19 in full effect; wherefore it would not be permissible to throw the battery into circuit without first raising the voltage of the generator. In order to develop a voltage in the generator at such time at least equal to or greater than that of the battery, a resistance 27 is bridged across the battery circuit between the switches 14 and 14' by connecting the same to appropriate sides of the pairs of contacts 25 and 26 respectively, as shown in Fig. 1, which contacts project forward less than the adjacent posts of the switch 14', as shown in Fig. 5. In connecting the generator to the battery the switch 14 is closed against contact 15, thereby connecting the resistance 27 across the generator circuit (and in the present instance cutting out the motors).

The switch 14' is then almost immediately closed, but in the brief interval the voltage of the generator is raised sufficiently by virtue of the current taken by the resistance member 27. When switch 14' has begun to make contact with the switch posts, and before the blades have settled fully into place, there is an instant during which the circuit is closed both through switch 14' and resistance 27, but as the switch comes to its fully closed position the handle is wedged in between the spring contacts 25 or 26 and thereby opens the voltage raising circuit so that no more current is consumed by said resistance. In charging, the circuit is completed from the lead 9 to the switch terminal 28, passing by way of a fuse 9.1., knife blade, terminal 29, thence by way of the lead 30, battery 10, from the battery 10 by way of the lead 31, switch terminal 32, by way of the knife blade to the terminal 28', which is directly connected to the battery switch 14.

When the battery is discharging the circuit starts from battery 10 lead 30 to terminal 29, switch blade, terminal 28', the battery switch 14, terminal 15, and thence to generator brush 17 by way of lead 16. From generator brush 2 circuit continues through series field coil 4 by way of lead 3, through solenoid 6 by way of lead 5, thence by way of lead 7 through solenoid 8 and lead 9 through fuse 9.1, terminal 28, knife blade, terminal 32, completing circuit to battery by lead 31. At such time the circuit through the shunt field 19 is preferably open, rheostat 20 being then open circuited.

In general it is quite important when a battery is used in connection with a generator charging same that generator be not reversed in polarity relative to battery. If this happened, battery and generator would be placed in series and both short circuited. Given a rotating armature in a series generator with a given magnetic polarity of poles, the armature generates a corresponding electrical polarity plus and minus. Should the magnetic polarity of poles be reversed, the corresponding electric polarity would also be reversed to negative and positive. If switch 14' did not reverse battery connections, the magnetic polarity would be reversed, and so also the generator positive and negative which would make battery charging impossible. It does not affect the direction of armature rotation to reverse battery, as armature and series field relation are still the same.

The series field coil 4 is provided with a plurality of taps 33 which are electrically connected with the series solenoid 6 in such manner that when an excess current flows through the solenoid 6, the plunger 34 actuates the contact bar 35 to progressively short circuit sections of the series field coil 4. Leads 36 connect the taps 33 with sliding contacts 37, there being two contacts 37 for each tap 33, alternate contacts being provided with a suitable resistance 38 to more evenly grade the steps by which the sections of the coil 4 are short circuited, thus reducing the magneto-motive force of the generator. The field weakening effect of coil 6 may be either opposed or supplemented manually if desired accordingly as faster or slower vehicle speed is desired, especially when the road is smooth and level in which case an extra high speed may be had without overloading any of the equipment.

The driving motors comprise two similar machines having armatures 39 and 40 and field coils 41 and 42. These motors are connected preferably to the rear wheels respectively of the vehicle, and in order to facilitate pivoting or turning about a point under one of the rear wheels or between the same, as is often desirable when a vehicle is maneuvering for a certain position, and especially in a motor truck when taking its position at a platform, siding or the like, are connected by switches to the power circuit in such manner as to be reversible independently of each other. The leads from the armature 39 are connected to the switch clips 43 and 44, and are also cross-connected to the switch clips 45 and 46. The armature 40 in a similar manner is connected to the switch clips 47 and 48, which are cross-connected by suitable leads to the switch clips 49 and 50. The field coil 41 is connected by suitable leads to the double switch blades 51 and 52. In a similar manner, the field coil 42 is connected to the double end switch blades 53 and 54. The armature switch blades 55 and 56 are directly connected to the blades 57 and 58. In a similar manner, the other pair of armature blades 59 and 60 are connected to the blades 61 and 62.

The switch clip contacts 63 and 64 are connected to a solenoid coil 65 which is capable, through the sliding contact 66, of automatically controlling the resistance 67 in the circuit between the clips 63 and 64. The switch clips 68 and 69 are in a similar manner connected to a solenoid 70, which, through a sliding contact 71, controls the resistance 72 in the circuit between the switch clips 68 and 69. The solenoids 65 and 70 are arranged to cut the resistances 67 and 72 into the corresponding armature braking circuits respectively when the switches are thrown to short circuit the armatures 39 and 40, and said solenoids are adapted to gradually cut out said resistances as the current decreases and the armatures slow down and come to rest. Such automatic action may be modified manually whenever desired to either assist or oppose the brake solenoid for retarding or hastening the brake action respectively. The switch blades 51, 52, 57, 58, 61, 62, 53, and 54 are mechanically secured to a switch bar 73, the motion of which may be controlled by the usual foot lever 74'. The link 74, between such foot lever and the bar 73, is provided with a pair of bosses 75 which engage rollers 76 normally under compression and so disposed as to prevent the switch bar 73 from stopping in the neutral position, as shown in Fig. 1. The switch blades 55 and 56 are mechanically secured to a switch arm or bar 77, which is provided with a link 78, the connection between the link 78 and the bar 77 being formed by means of a sliding pivot 79. The link 78 is also mounted on a fixed pivot 80.

The backward or forward movement of the switch blades 55 and 56 is accomplished by means of a compound bar 81, one side of which is mounted on a pivot 82 and is joined to a link 83 by means of a pivot 84. The link 83 is provided with stops 85 and 86. Between the link 78 and the stop 86 is a spring 87 normally holding the link 78 in contact with the stop 85. A steering wheel 88 is provided with a dog 89 so disposed as to contact with the link 78 to operate the switch bar 77 in case the steering wheel is turned beyond a certain predetermined limit. The switch bar 77 is provided with a pair of raised curved bosses 90 and 91, so disposed as to contact with the roller 92, which is held under compression by the spring 93, in order to prevent the bar 77 from stopping halfway between the neutral position and either forward or backward position. In a similar manner, the switch blades 59 and 60 are secured to a switch bar 94, which is connected by a similar linkage to a second compound bar 81, and the link 95 is arranged to be actuated by means of the dog 96 on the steering wheel 88. The said bars or levers 81 are arranged with their free ends oscillatably connected to a link 81.1, which in turn is pivoted to a manually operatable lever 81.2 having a stationary pivot 81.3. Normally a downward movement of the free end of lever 81.2 causes upward movement of bars 77 and 94 and vice versa, as illustrated in Fig. 1.

The core of the solenoid 8 is connected to a lever 102 to which is pivotally connected a link 103 slidably mounted on the arm 104. The link 103 is provided with a shoulder 105 adapted to operate between the shoulders 106 and 107 on the arm 104. The arm 104 is suitably connected to the carbureter (not shown) of the prime mover, if it is a hydrocarbon engine. The core of the solenoid 22 is connected to a lever 108 which has pivotally connected thereto a link 109 slidably mounted on the arm 110. The link 109 is provided with a shoulder 111 operating between the shoulders 112 and 113 on the arm 110. The arm 110 is suitably connected to the timing device (not shown) of the prime mover, if it is a hydrocarbon engine. The lever 102 is extended beyond its pivot 114 to lever 115, which connects to carbureter throttle 116. The lever 108 is extended beyond its pivot 117 to the spark timing device 118 by means of lever 119.

The functions of the solenoids 8 and 22 are to regulate the supply of fuel to and the sparking in the hydrocarbon engine. The connections are so made that as the load increases the solenoid 8 will be actuated to cause a movement of the arm 4 which will open the carbureter to permit a greater supply of fuel, and the increase in voltage also actuates the solenoid 22 so as to shift the arm to cause an advance of the spark.

The forward running position of the motors is shown in Fig. 2, in which a lead from the generator is led to the switch clip 12 through the blade 51 to the field 41, from which it returns to the blade 52. The blade 52 is connected to the blade 57, which is in turn connected with the armature switch blade 55, from which the circuit is led to the armature 39 and back to the corresponding switch blade 56. The armature switch blade 56 is connected to the blade 58, which is permanently connected by means of the series connector 97 to the switch blade 61, thence to the armature switch blade 59, to the armature 40, back to the corresponding armature blade 60, thence to the switch blade 62, to the field switch blade 53, thence to the field 42, back to the corresponding field blade 54, which is in contact with the switch clip 98, which is directly connected to the generator line L.

The electrical braking position of the motors is shown in Fig. 3, in which the active spring clips connected with the line L—L are the switch clips 13 and 99. Starting from the switch clip 13, the circuit is completed through the switch blade 51, through the field coil 41, back to the switch blade 52, which is connected by way of the clip 100 and its connecting lead to the said series connector 97, thence to the clip 101 by way of its connecting lead to the field coil 42, back to the switch blade 54, and by way of the switch clip 99 to the line L, the circuit having been completed by passing through the field coils 41 and 42. At the same time the armature 39 is connected to the armature blades 55 and 56, which are directly connected to the switch blades 57 and 58, an arrangement which short-circuits the armature 39 through the solenoid 65 and the solenoid adjusting resistance 67. In a similar manner, the armature 40 is connected to the solenoid 70 and the solenoid adjusting resistance 72.

In Fig. 4 is shown the positions of the switches in which the motor armature 39 will revolve in the forward direction, and the motor armature 40 will revolve in the reverse direction, in which position the line L is connected to the active clip 12, and the circuit through the armature 39 and its field 41 is exactly similar to the arrangement as shown in Fig. 2, and the circuit through the armature 40 and the field 42 is similar to that shown in Fig. 2, except that the direction of the current through the armature 40 is reversed by moving the switch blades 59 and 60 to contact with the switch clips 49 and 50.

Although but one specific embodiment of this invention is herein shown and described, it will be understood that numerous details of the construction shown may be altered or omitted without departing from the spirit of this invention, as defined by the following claims.

I claim:—

1. In an automobile a series generator, a prime mover for driving said generator, a storage battery, means for connecting said generator to said battery for charging the latter, said means comprising a double throw reversing switch, a resistance, means for connecting said resistance across the charging circuit between said generator and battery, and contact means adjacent to the two opposite positions of closure of said switch respectively and operatable by the closure of said switch to open the circuit of said resistance.

2. In an automobile, a prime mover, a series generator driven thereby, a pair of series motors driven by said generator, manual double throw switching means for each motor for reversing the current through the motor armatures respectively, said switching means being connected cooperatively for movement to connect the armatures either in the same or opposite directions, dynamic braking means for the motor armatures, independent manual double throw switching means for either connecting the motor armatures in series with the line and motor fields or connecting the motor fields directly in series with the line and cutting the motor armatures over to said braking means, said generator having automatic current control means comprising a series solenoid switch for reducing the number of effective turns of the series winding as the current increases and vice versa.

3. In an automobile, a series generator, a series motor driven thereby, a dynamic brake resistance conductor for said motor, reversible switching means operatable in one direction to simultaneously connect the motor field directly to the line and the motor armature to said brake conductor, and in the opposite direction to simultaneously connect the motor armature and field in series with the line, and series connected generator field control means for keeping the generator current down to normal while the motor armature is connected to the brake.

4. In an automobile, a pair of series traction motors, means for short circuiting the armatures of said motors respectively for arresting their motion, direction control means for said armatures comprising means for simultaneously reversing the connection of said armatures with respect to the power circuit, and means arranged to reverse the connection of either of said armatures to the power circuit independently of the other.

5. In an automobile a pair of series traction motors, in combination with a steering wheel, and means controlled by said steering wheel arranged for reversing the connection of either armature of said motors with respect to the power circuit according to the direction in which the steering wheel is turned.

6. In an automobile a pair of series traction motors, in combination with a double throw switch arranged when thrown to one position to connect the armatures of said motors to the power circuit, and when thrown to its reverse position to short circuit said armatures, said switch being connected and arranged to open both the armature and field circuits in throwing from either one of its positions to the other, and a pair of double throw switches arranged for independently reversing the polarity of the power circuit leading to the said armatures respectively.

7. In an automobile a pair of series traction motors, in combination with double throw switching means arranged for connecting the armatures of said motors either to the power circuit or to short circuit said armatures and to connect the motor fields to the line in series with each other, controlling means for urging said switching means either way from their neutral open position to either closed position, double throw switches arranged for reversing the polarity of the power circuit normally leading to said armatures, and controlling means for urging the last mentioned switches either to their neutral open position or to either of their closed positions.

8. In an automobile a pair of reversible series traction motors, in combination with reversible control switches therefor, separate connecting means for operating said switches, a steering wheel arranged to engage either of said connecting means for reversing either switch and corresponding motor when the said steering wheel is turned to a certain angle in either direction respectively.

9. In an automobile a pair of reversible series traction motors, in combination with control switches therefor, double armed connecting means operatable manually for reversing the said switches simultaneously, and a steering wheel arranged to actuate either arm of said connecting means to reverse either of said switches when the hand wheel is turned to a certain angle in either direction respectively for turning the vehicle.

10. In an automobile, an electric generator, an internal combustion engine for driving said generator, an electric traction motor connected electrically to said generator to be driven thereby, said generator having a series field winding and automatic control means arranged for reducing the number of effective turns of said winding as the current increases, automatic means for varying the adjustment of the engine spark timer according to the voltage of said generator, said means comprising a solenoid connected across the terminals of said generator and a plunger for said solenoid, and automatic means for regulating the admission of fuel to the engine according to the current output of the generator, said means comprising a solenoid connected in series with the load circuit and a plunger for said solenoid.

Signed at Chicago this 2nd day of June 1911.

JOHN W. PEARSON.

Witnesses:
 I. L. REYNOLDS,
 J. A. PAYTON.